May 30, 1939.  R. T. STEWART  2,160,295
LUBRICATION APPARATUS
Filed June 16, 1937  5 Sheets-Sheet 1

RALPH T. STEWART,
INVENTOR.

BY Paul N Eaton
ATTORNEY.

RALPH T. STEWART,
INVENTOR.

BY
ATTORNEY.

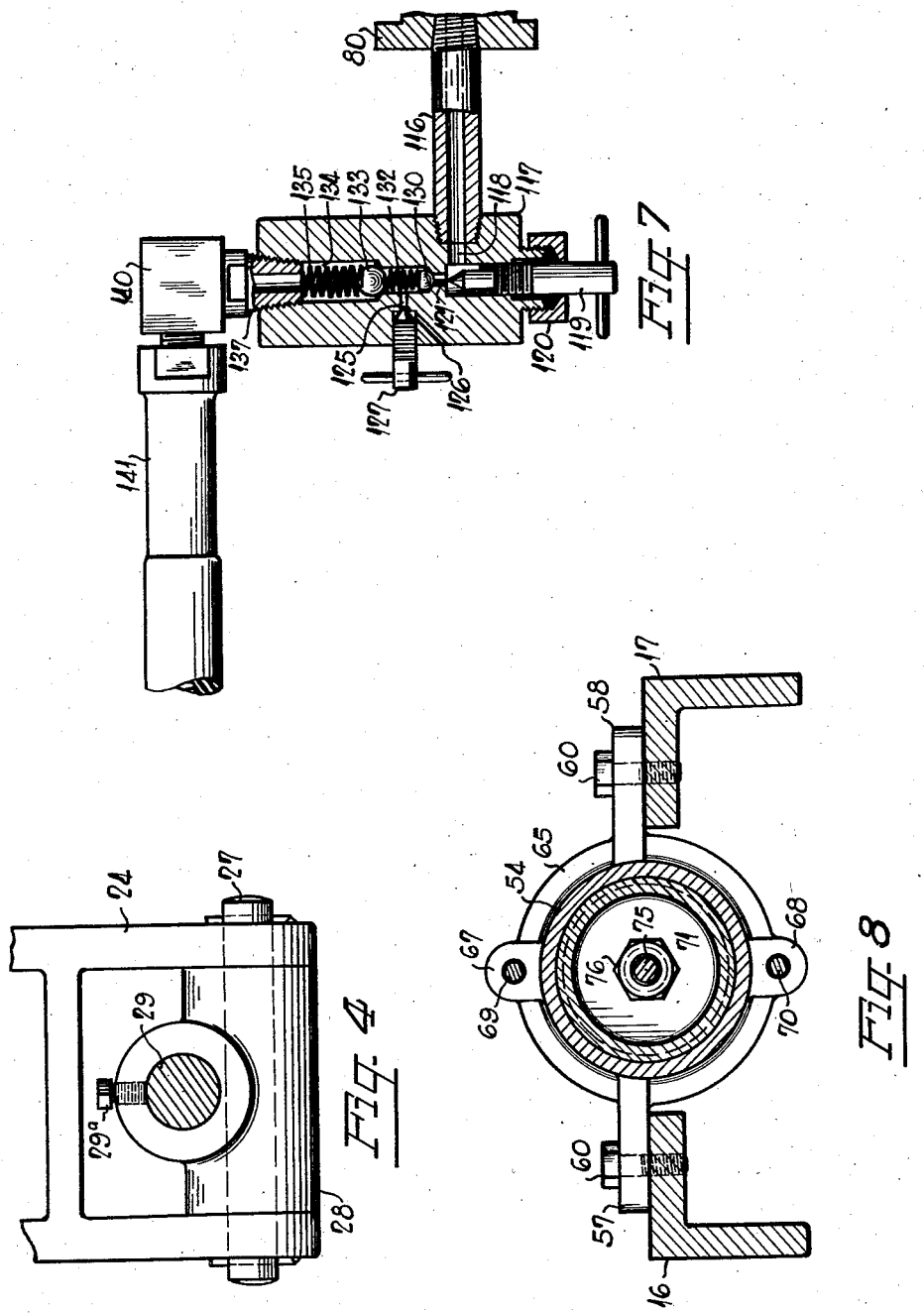

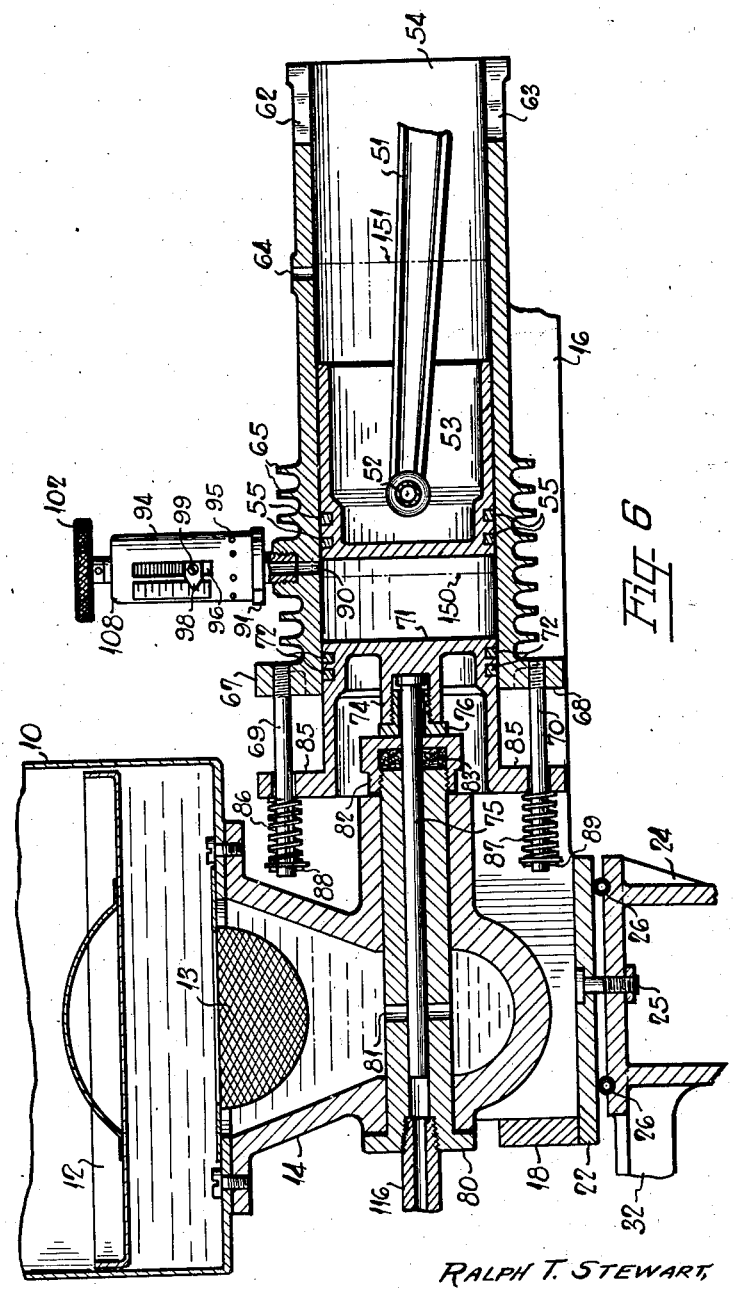

Patented May 30, 1939

2,160,295

UNITED STATES PATENT OFFICE 2,160,295

LUBRICATION APPARATUS

Ralph T. Stewart, Winston-Salem, N. C., assignor to Radiator Specialty Company, Charlotte, N. C., a corporation of North Carolina Application June 16, 1937, Serial No. 148,611

9 Claims. (Cl. 221—47.1)

This invention relates to a lubrication apparatus and more especially to a wheeled portable lubrication apparatus having a lubricant pump mounted thereon and having a lubricant container associated with the pump and provided with a discharge or delivery hose connected to said pump, said pump having a piston connected to another piston forming a movable head mounted in one end of a cylinder and said cylinder having a second piston therein driven by a prime mover such as a gasoline engine with said pistons in said cylinder having an adjustable discharge or pressure release valve whereby the amount of pressure built up between the piston connected to the prime mover and the piston connected to the lubricant pump can be adjusted.

It is an object of this invention to provide a lubrication apparatus comprising a wheeled truck having a lubricant pump mounted thereon, a prime mover for driving the lubricant pump and air cushioning means disposed between the prime mover and the lubricant pump whereby the lubricant pump is driven by the air pressure built up by the prime mover and also whereby the lubricant pump is automatically operated in accordance with the amount of lubricant which is allowed to discharge from the discharge end of the lubricant delivery hose.

It is another object of this invention to provide a portable lubricant pump driven by a prime mover and comprising a pneumatic apparatus having a piston in both ends of the same, one piston being driven by the prime mover and the other piston being driven by compressed air generated by the piston driven by the prime mover with a pressure release valve and whereby, when the pressure has been built up in the lubricant discharge line to a predetermined amount, stoppage of the lubricant pump will automatically cease while the prime mover continues to run and upon discharge being made from the lubricant pump a release in pressure in the discharge line will cause immediate renewal of operation of the lubricant pump so that the lubricant is kept under an approximately constant pressure in the discharge hose.

Some of the objects of the invention having been stated, other objects will appear as the description proceeds when taken in connection with the accompanying drawings, in which:—

Figure 4 is a vertical, sectional view taken along the line 4—4 in Figure 3;

Figure 6 is a longitudinal, sectional view showing portions in elevation and being taken along the line 6—6 in Figure 2;

Figure 7 is a vertical, sectional view taken along the line 7—7 in Figure 2;

Figure 8 is a transverse, vertical, sectional view taken along the line 8—8 in Figure 2.

Figure 1:
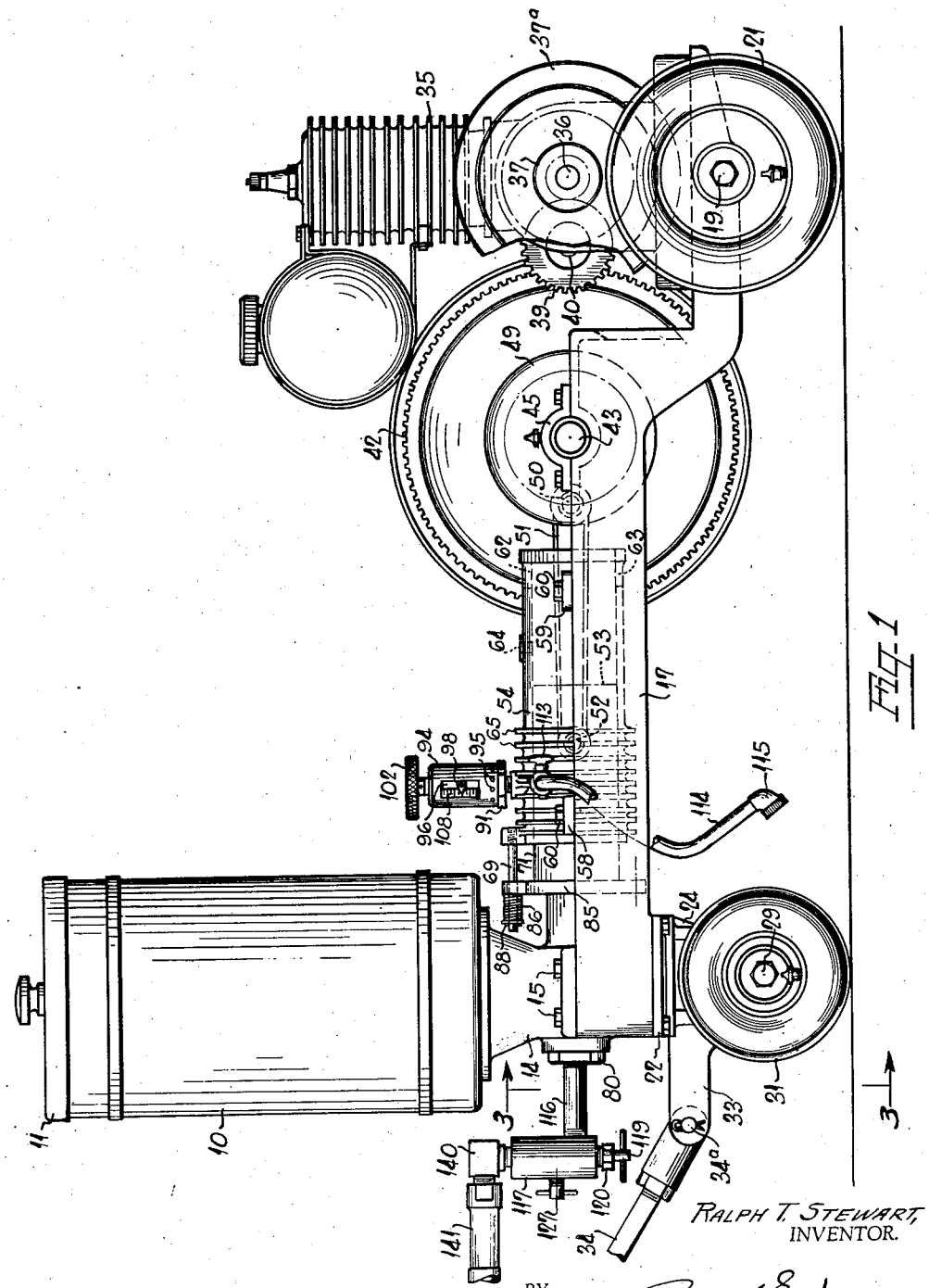
Figure 1 is a side elevation of my lubrication apparatus.

Referring more specifically to the drawings, the numeral 10 indicates a suitable lubricant container having a lid 11 and a follower lid 12 being secured to a lubricant pump housing 14. Lubricant pump housing 14 is secured by any suitable means such as bolts 15 to the side frame members 16 and 17, the front ends of said frame members 16 and 17 being joined by front end member 18. The rear ends of side frame members 16 and 17 are suitably connected to a rear axle 19 on which wheels 20 and 21 are rotatably mounted. Secured to the lower front edges of side frame members 16 and 17 and to the lower edge of front member 18 is a plate 22 against which a caster frame 24 is pivotally mounted by bolt 25. Caster frame 24 on the upper surface thereof has a raceway in which balls 26 are mounted. The caster frame is forked at its lower end and has a pin 27 penetrating the same on which a bearing 28 is mounted which is penetrated by axle 29 which is secured in position by any suitable means such as set screw 29a. The axle 29 has mounted on the outer ends thereof wheels 30 and 31.

Caster frame 24 has a pair of spaced forks 32 and 33 penetrated by a pin 34a on which is mounted a draft bar or tongue 34. This mounting of the front axle allows vertical movement of the front wheels without appreciably raising the frame.

Mounted on the rear end of the frame members 16 and 17 is a suitable prime mover such as a gasoline engine 35 which has a drive shaft 36, on one end of which may be mounted a suitable rope-starter pulley 37. A balance wheel 37a is also mounted upon shaft 36 to give the proper momentum to the moving parts of the prime mover. On the other end is mounted a pinion 38 which meshes with a pinion 39 mounted for rotation on a stud shaft 40, pinion 39 having integral therewith pinion 41 which meshes with a large gear 42 fixedly mounted on a crank shaft 43 which crank shaft is mounted in bearings 44 and 45 on top of side frame members 16 and 17, respectively.

Crank shaft 43 has a crank throw therein comprising disks 48 and 49 having a pin 50 bridging the gap therebetween on which one end of connecting rod 51 is mounted for rotation. Connecting rod 51 has its other end secured on a wrist pin 52 mounted in piston 53 which is mounted for reciprocatory movement within cylinder 54. Piston 53 has suitable rings 55 therearound. Cylinder 54 has a plurality of lugs 56, 57, 58 and 59 projecting therefrom which rest on top of side frame members 16 and 17, and bolts 60 penetrate these lugs and the side frame members for securing the cylinder 54 in position.

Figure 2:
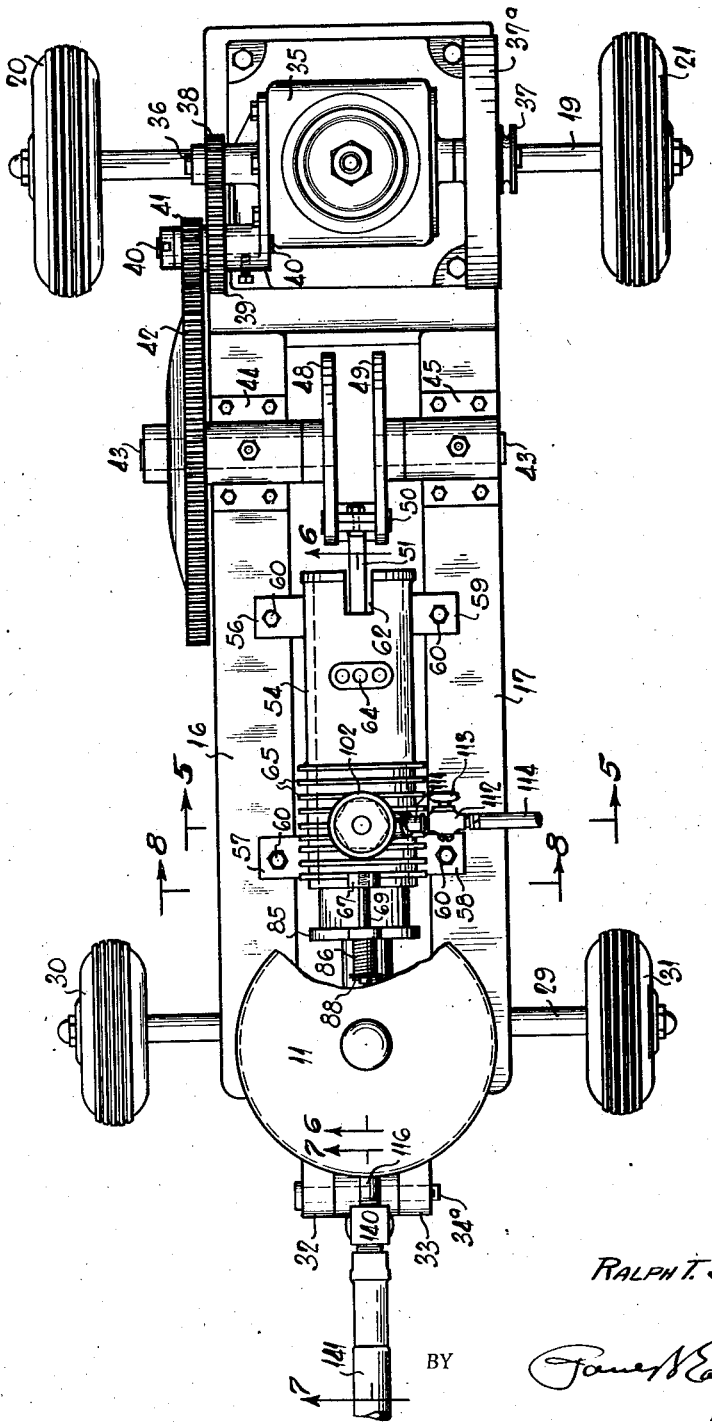
Figure 2 is a top plan view of the lubrication apparatus.
Figure 3:
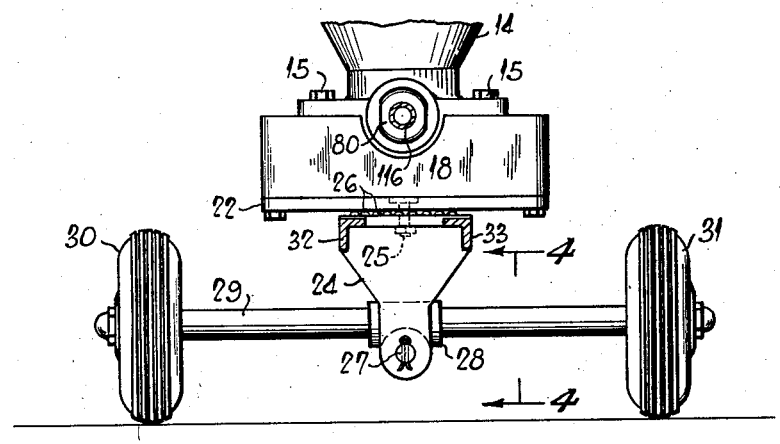
Figure 3 is a sectional, front end view of the lower portion of the lubrication apparatus and taken along line 3—3 in Figure 1 showing the front portion of the wheel truck.

The cylinder 54, at its right-hand end in Figures 2 and 6, is slotted as at 62 and 63 to prevent the connecting rod 51, in its reciprocation and oscillation, from engaging the sidewalls of the cylinder. The cylinder 54 also has an intake port 64 which may be of any desired size to allow the breaking of the vacuum and intake of a fresh supply of air when the piston is drawn all the way to the right in Figure 6. The cylinder 54 also has a plurality of cooling vanes 65 therearound on its exterior.

At the left-hand end of the cylinder in Figure 6, there are two projections 67 and 68 in which pins 69 and 70 are fixedly secured. A piston 71 is mounted for reciprocation in the left-hand end of the cylinder in Figure 6, and has suitable rings 72 therearound. The piston 71 has an internal projection 74 in which is loosely mounted a lubricant pump piston 75 by means of a nut 76. This is a loose fit to allow lateral and longitudinal movement within a limited extent between piston 71 and lubricant pump piston 75. Lubricant pump housing 14 has a suitable barrel 80 therein which has a cross port 81 for the admission of lubricant into the barrel 80. The right-hand end of this barrel in Figure 6, is capped by a threaded cap 82. A suitable packing 83 is disposed within the cap and around lubricant piston 75.

Piston 71 has a skirt 85 on the left-hand end thereof in Figure 6, which is loosely and slidably penetrated by the pins or bolts 69 and 70. These bolts or pins 69 and 70 are considerably longer than piston 71 and have on the left-hand end thereof in Figure 6, compression springs 86 and 87 confined by suitable cotter pins 88 and 89 in the extreme left-hand end of the pins 69 and 70. The purpose of these compression springs being to limit the travel of piston 71 to the left in Figure 6, to prevent it from being forced outside the cylinder 54. At a point disposed between the proximate faces of pistons 53 and 71, there is a port 90 into which is screwed a fitting 91, said fitting 91 having a bore 92 therethrough with a ball 93 resting on its upper end. Threadably secured to the upper end of fitting 91 is a shell or casing 94 having ports 95 in the lower portion thereof for the escape of air and also having a vertically disposed slot 96 in which a projection or guide 97 is adapted to have vertical sliding movement. This projection 97 has a pointer 98 secured thereon by means of screw 99 which also penetrates a member 100 threadably disposed around a pin 101 having a knurled nut 102 secured on the upper end thereof as by pin 103. This pin 101 has an enlargement 104 therearound immediately below the restricted upper end of casing 94.

Secured to ball 93 is a member 105 and disposed between members 105 and 100 is a compression spring 106, the purpose of said spring being to normally force ball 93 to seated position under a pressure proportionate to the position of member 100 as it is adjusted by turning handle 102. On the exterior of casing 94 is a suitable scale 108 for cooperation with pointer 98 whereby the apparatus can be set to allow escape of air pressure from the cylinder at a predetermined setting of pounds per square inch.

Cylinder 54, at the same cross sectional point as port 90 has a port 110 into which is threadably fitted a suitable fitting 111 to which is connected a valve fitting 112 having valve 113 therein and to the other end of valve fitting 112 is secured a suitable hose such as a rubber air line hose 114 having a conventional valve 115 at its extreme end adapted to fit the intake valve as in automobile tires and the like, so that the apparatus may also be used as a compressor for inflating automobile tires when the pressure has been built up to a predetermined point in the discharge hose line and while the apparatus is not being used for lubrication purposes, as for example, when valve 119, to be described later, is closed.

Threadably secured in the discharge end of barrel 80 is a fitting 116 and to the other end of this fitting 116 is threadably secured a member 117 having a vertically disposed passageway therethrough, and a port 118 forms communication between the interior passageway in member 116 and the vertically disposed passageway in member 117. In the lower end of member 117 is threadably secured a needle valve 119 having a suitable packing nut 120 therearound. This needle valve is adapted to be adjusted to regulate the valve opening at point 121. Also, member 117 has a transverse passageway 125 with an oblique passageway 126 communicating therewith and a needle valve 127 is threadably mounted in enlarged outer portion of passageway 125 and whereby the size of the opening between passageways 125 and 126 may be effectively adjusted. Immediately above the point of contact of needle valve 119 with the passageway in member 117 an enlarged portion appears in which a ball 130 is disposed and is resting on the upper end of restricted passageway 121. This ball 130 is normally pressed downwardly by means of a compression spring 132. The upper end of compression spring 132 is contacted by a ball 133 which rests at the bottom end of an enlarged passageway 134 which is larger than passageway 121 and a compression spring 135 has its lower end resting on the upper portion of ball 133. A hollow plug 137 is threadably secured in the upper end of passageway 134 and normally forces the ball 133 downwardly against its seat and this, in turn, forces ball 130 downwardly against its seat. These balls serve as check valves to prevent back pressure in the lubrication line from having effect on the pump piston 75.

The upper end of plug 137 has a conventional swivel joint 140 disposed therearound to which is connected a conventional lubrication hose 141 which extends to a suitable conventional discharge nozzle adapted to engage a suitable fitting on bearings of automobiles and other machinery so that when the fitting is in place, on the bearing, the lubricant may be discharged by conventional release means, not shown.

*Method of operation*

Figure 5:
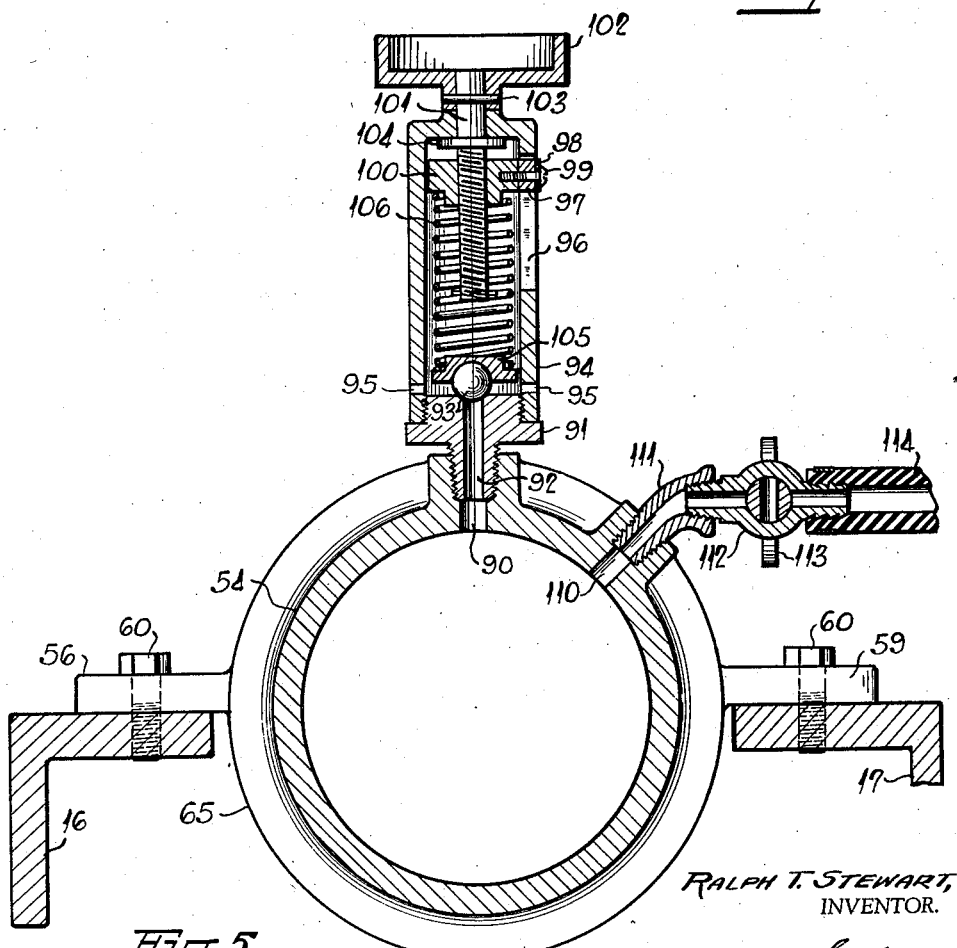
Figure 5 is an enlarged, cross-sectional view taken along the line 5—5 in Figure 2.

While in operation, the gasoline engine or other prime mover will run continuously, reciprocating piston 53. During the travel of piston 53 to the right in Figure 6, there will be a partial vacuum created which will pull piston 71 to dotted line 150, which will pull the left-hand end of pump piston 75 to the right, past the port 81 and draw a charge of lubricant into the bore in barrel 80. When the piston 53 has traveled to its extreme right-hand position in Figure 6, which is to the dotted line 151, the vacuum between the pistons 53 and 71 will be broken and air under atmospheric pressure will rush in through port 64 while the piston is temporarily stopped at the end of its throw and upon forward movement of piston 53 to the left in Figure 6, the air within the cylinder will be compressed, driving the piston 71 and pump piston 75 to the left and thus forcing a charge of lubricant into the delivery hose 141. This reciprocation continues until a predetermined pressure has been built up in the delivery hose 141. As the pressure increases in the hose, then the length of stroke of piston 75 will decrease until reciprocation of the pump will entirely cease, and as the length of stroke of the pump piston decreases, air will be allowed to escape through port 92, (Figure 5), depending upon the setting of the gauge 98. When lubricant is released from the hose 141 this will lower the pressure in the hose and thus piston 75 will again reciprocate, the length of its stroke being controlled by the amount of lubricant released from the hose. It is thus seen that there will be no wide differential in pressure in the delivery hose, but on the other hand, the pressure in the delivery hose will remain practically constant for the reason that the instant the pressure falls in the delivery hose line, this will automatically allow movement of the pump piston and thus the escaping air will be diminished temporarily or entirely stopped, as its power will be utilized in pumping lubricant instead of allowing the same to escape through port 92. The great difference in areas of piston 71 and pump piston 75 will give great pressure in the delivery hose as 100 pounds pressure in the cylinder will give more than 10,000 pounds pressure in the delivery hose. The amount of pressure given to the lubricant can be controlled by the setting of valve 102, to allow escape of air from between the pistons at the desired pressure.

In the event that an electrical motor should be employed instead of an internal combustion engine, it is evident that the piston 71 could be utilized to hold a switch open to stop the motor and upon pressure being lowered in the delivery hose the piston 71 would move and the electric motor would start, thus eliminating the necessity for an electric motor running continuously.

There are also internal combustion engines which start automatically upon the closing of a circuit leading thereto, as for example, rural lighting plants. This type of internal combustion engine could be utilized and the position of the piston 71 could be utilized for starting and stopping this type of internal combustion engine.

In the drawings and specification there has been set forth a preferred embodiment of the invention and although specific terms are employed, they are used in a generic and descriptive sense only, and not for purposes of limitation, the scope of the invention being set forth in the appended claims.

I claim:

1. Lubrication apparatus comprising a lubricant pump, a delivery hose connected to the output side of said pump, a cylinder open at both ends and unobstructed throughout its length, a piston disposed at one end and connected to said pump, a second piston mounted in the other end of said cylinder and having connections with a prime mover for driving the same to create air pressure between the two pistons for reciprocating said pump, the first piston projecting beyond the open end of the cylinder and having a lateral projection thereon, a guide projecting from the exterior of the cylinder, and slidably penetrating said projection, and resilient means on the guide for limiting the outward movement of the first piston.

2. Lubrication apparatus comprising a lubricant pump, a delivery hose connected to the output side of said pump, a cylinder open from one end to the outer end and having a piston disposed in one end and connected to said pump, a second piston mounted in the other end of said cylinder and having connections with a prime mover for driving the same to create air pressure between the two pistons for reciprocating said pump, and means permitting escape of compressed air from the space between the two pistons when said compressed air has been compressed to a predetermined pressure, the first piston projecting beyond the open end of the cylinder and having a lateral projection thereon, a guide projecting from the exterior of the cylinder, and slidably penetrating said projection, and resilient means on the guide for limiting the outward movement of the first piston.

3. Lubrication apparatus comprising a lubricant pump, a cylinder open through its entire length, a piston mounted for reciprocation in one end of the cylinder and having a connection with the lubricant pump, a second piston mounted in the other end of the cylinder for reciprocatory movement therein, a prime mover for imparting reciprocatory movement to the second piston to compress the air between the two pistons to move the first piston to thereby operate the pump.

4. Lubrication apparatus comprising an internal combustion engine, a lubricant pump, a pneumatic engine disposed between the pump and the internal combustion engine for driving the pump, and adjustable means for allowing escape of air from the pneumatic engine when the pump has built up a predetermined pressure in the lubricant.

5. Lubrication apparatus comprising a lubricant pump having a delivery hose connected to the output side of the pump, a pump piston, a compressor having a reciprocating piston driven by the engine, and also having a piston connected to said pump piston, said compressor having an adjustable release valve, the stroke of the pump piston being governed by the pressure built up in the delivery hose, the compressed air between the compressor piston and the piston connected to the pump piston being adapted to escape through said valve when the pressure in the delivery hose equals that in the space between the compressor piston and the piston connected to the pump piston.

6. Lubrication apparatus comprising an internal combustion engine, a cylinder having its ends open, a piston mounted for reciprocation on one end of the cylinder and having operative connection with said engine, a movable head mounted in the other end of the cylinder, a lubricant pump including a reciprocating plunger having one end connected to said movable head, a delivery hose connected to the output side of said lubricant pump, resilient means engageable by said movable head after it has substantially completed its outward movement for limiting the outward movement of said movable head, an adjustable relief valve mounted in the wall of said cylinder and having communication with the interior of said cylinder at a point between the two limits of travel of said piston and said movable head, said valve permitting egress of compressed air from said cylinder when the pressure built up in the delivery hose equals that in the cylinder upon completion of a compression stroke of said piston.

7. Lubrication apparatus comprising a lubricant pump having a plunger, a cylinder open from one end to the other and having a movable head in one end thereof and having a portion thereof disposed at all times on the exterior of the cylinder and having another portion provided with compression rings and adapted to have reciprocatory movement within one end of the cylinder, a connection between said head and said plunger, guide means disposed in parallel relation to the longitudinal center of the cylinder and disposed outside the circular plane defined by the walls of the cylinder, projections on that portion of the head which is outside the cylinder and which are penetrated by the said guide means, a compressor piston mounted for reciprocatory movement in the other end of the cylinder for forming an air cushion between the piston and the head for propelling the head in one direction when the compressor piston is moving in one direction and for moving the head by suction when the piston moves in the other direction, and resilient means disposed on said guide means and engageable by said projection on said head after the head has travelled a substantial distance under a compression stroke of the piston for arresting movement of the head.

8. Lubrication apparatus comprising a lubricant pump having a plunger, a cylinder open from one end to the other and having a movable head in one end thereof and having a portion thereof disposed at all times on the exterior of the cylinder and having another portion provided with compression rings and adapted to have reciprocatory movement within one end of the cylinder, a connection between said head and said plunger, guide means disposed in parallel relation to the longitudinal center of the cylinder and disposed outside the circular plane defined by the walls of the cylinder, projections on that portion of the head which is outside the cylinder and which are penetrated by the said guide means, a compressor piston mounted for reciprocatory movement in the other end of the cylinder for forming an air cushion between the piston and the head for propelling the head in one direction when the compressor piston is moving in one direction and for moving the head by suction when the piston moves in the other direction, resilient means disposed on said guide means and engageable by said projection on said head after the head has travelled a substantial distance under a compression stroke of the piston, for arresting movement of the head, and a relief valve disposed between the piston and the head for allowing escape of compressed air from the space between the piston and the head when the pressure has reached a predetermined point.

9. Lubrication apparatus comprising a cylinder open at both ends and unobstructed throughout its interior, a piston mounted for sliding movement in one end of the cylinder and having a lateral projection on its outer end outside the cylinder, a rod secured to said cylinder and extending in a direction parallel to the longitudinal center of the cylinder and slidably penetrating said projection for guiding said piston, a pump having a plunger connected at one end to said piston, a second piston mounted for reciprocation in the other end of the cylinder for compressing the air between the pistons and moving said first piston and its plunger in one direction to perform a pumping stroke and serving to pull the first piston into the cylinder by suction on the return stroke of the second piston, an adjustable relief valve communicating with the space between the two pistons, the length of stroke of the first piston being regulated by the pressure built up by the pump and the setting of the relief valve.

RALPH T. STEWART.